(12) United States Patent
Mehra et al.

(10) Patent No.: US 9,468,845 B2
(45) Date of Patent: Oct. 18, 2016

(54) METHODS FOR USING TOUCH-SCREENS TO SIMULATE BALANCING AND MANIPULATION OF CURVED OBJECT DURING GAMEPLAY

(71) Applicant: Zynga Inc., San Francisco, CA (US)

(72) Inventors: Sumit Mehra, Bangalore (IN);
Shivendra Dayal, Bangalore (IN);
Moolchand Kuri, Bangalore (IN);
Robert Bates, Washington, DC (US)

(73) Assignee: Zynga Inc., San Francisco, CA (US)

( * ) Notice: Subject to any disclaimer, the term of this patent is extended or adjusted under 35 U.S.C. 154(b) by 106 days.

(21) Appl. No.: 14/259,125

(22) Filed: Apr. 22, 2014

(65) Prior Publication Data
US 2015/0297987 A1    Oct. 22, 2015

(51) Int. Cl.
*A63F 13/42* (2014.01)
*A63F 13/2145* (2014.01)

(52) U.S. Cl.
CPC ........... *A63F 13/2145* (2014.09); *A63F 13/42* (2014.09)

(58) Field of Classification Search
CPC ........................... A63F 13/2145; A63F 13/42
USPC ........................................................ 463/37
See application file for complete search history.

(56) References Cited

U.S. PATENT DOCUMENTS

| | | | | |
|---|---|---|---|---|
| 3,045,393 A * | 7/1962 | Knott | ......................... | A63F 9/14 198/619 |
| 8,199,105 B2 * | 6/2012 | Kuenzner | ............. | G06F 3/0338 345/157 |
| 8,303,408 B2 * | 11/2012 | Chosogabe | ............. | A63F 13/10 463/30 |
| 8,494,507 B1 * | 7/2013 | Tedesco | ..................... | A61F 4/00 434/112 |
| 8,630,633 B1 * | 1/2014 | Tedesco | ..................... | A61F 4/00 434/132 |
| 2010/0029384 A1 * | 2/2010 | Andersen | ................ | A63F 13/10 463/32 |
| 2010/0306680 A1 * | 12/2010 | Quennesson | ............. | G06F 8/38 715/763 |
| 2011/0291964 A1 * | 12/2011 | Chambers | ............. | G06F 1/1616 345/173 |
| 2015/0301817 A1 * | 10/2015 | Jornow | ..................... | G06F 8/64 717/176 |

* cited by examiner

*Primary Examiner* — Corbett B Coburn
(74) *Attorney, Agent, or Firm* — Martine Penilla Group, LLP

(57) ABSTRACT

Methods and computer programs include associating a three-dimensional collider component and a rigid body component to a two-dimensional game object used in the game play. The three-dimensional collider component and the rigid body component define a plurality of physics attributes to enable control of physical behavior of the game object. A second three-dimensional collider component is associated with a game cursor that is used for providing user input to the gameplay. The game cursor is defined as a two-dimensional object with at least a portion of the game cursor having a spherical contour. User input is detected at a touch screen interface of a computing device that is rendering the gameplay. The user input causes the spherical contour of the game cursor to control movement of the game object within the game scene of the gameplay, the movement being adjusted in accordance to physics attributes of the game object.

20 Claims, 14 Drawing Sheets

METHODS FOR USING TOUCH-SCREENS TO SIMULATE BALANCING AND MANIPULATION OF CURVED OBJECT DURING GAMEPLAY

BACKGROUND

1. Field of the Invention

The present embodiments relate to online video games, and more specifically, to simulating balancing of curved objects during game play of the online video games.

2. Description of the Related Art

A goal of any online game developer is to keep a user engaged in game play of a video game as long as possible, since longer engagement would relate to greater user satisfaction, ultimately leading to higher revenues. Toward this end, video game developers are developing games and providing various ways of simulating gameplay to make the games more realistic and interesting. Development of a video game is a very involved art. It involves designing scenes, determining what graphics to render, what rules to follow, what challenges and controls to provide, and how to go about designing a game that is realistic, functional and engaging. The objects within the video game, including game objects selected by users during gameplay, are mostly represented in two dimensional form and all interactions between the objects are interpreted in two dimensions.

The game objects in the video games are manipulated using different game mechanics. The game mechanics engaged in the interaction of game objects and in the rendition of game scene have to be convincing and realistic thereby enhancing the user's gaming experience in order to attract and engage a user. For example, when an object traveling at a speed collides with either a stationary object or another moving object, the object(s) have to exhibit appropriate physical behavior, such as acceleration or deceleration correctly to reflect the effect of collision and the speed of collision. To this effect the game mechanics need to provide tools and/or logic to allow manipulation of game objects to exhibit convincing physical behavior simulating various laws of physics during various interactions, such as a collision with another object based on relative motion of the objects (for e.g., acceleration, deceleration, gravitational force, etc.), collision of a game object on a surface based on the material the surface and the game object are supposed to represent (for e.g., ice surface vs. rubber ball, etc.) etc. However, the mechanics that are commonly used in video games are simple and do not take into consideration such fine details while manipulating the game objects during the gameplay.

It is in this context that embodiments of the invention arise.

SUMMARY

Various embodiments are presented for controlling user input in a gameplay of a video game. It should be appreciated that the present embodiments can be implemented in numerous ways, such as a method, an apparatus, a system, a device, or a computer program on a computer readable medium. Several embodiments are described below.

In one embodiment, a method for controlling user input in a gameplay of a video game is disclosed. The method includes associating a three-dimensional collider component and a rigid body component to a two-dimensional game object used in the game play. The three-dimensional collider component and the rigid body component are used to define a plurality of physics attributes to enable control of physical behavior of the game object. A second three-dimensional collider component is associated with a second object that is used for providing user input to the gameplay. The second object is defined as a two-dimensional object with at least a portion of the second object having a spherical contour. User input is detected at a touch screen interface of a computing device that is rendering the gameplay. The user input causes the spherical contour of the second object to move and control the game object within the game scene of the gameplay. One or more physics attributes of the game object are considered during the movement and control by the second object.

In one embodiment, the geometry of the collider component correlates with dimension and shape of the game object and the geometry of the second collider component correlates with the dimension and shape of the second object.

In one embodiment, the game object selected for gameplay has a circular contour.

In one embodiment, the shape of the collider component provided around the game object is a box collider, a sphere collider, a capsule collider, a wheel collider or one or more combinations thereof.

In one embodiment, the user input is used to balance the game object on the spherical contours of the second object.

In one embodiment, the user input is used to balance the game object on the spherical contours of the second object and to flick the game object across the game scene during gameplay. The flick action is used to determine velocity that is to be imparted to the game object during controlling of the game object.

In one embodiment, the velocity is determined by identifying video frames associated with the user input defined in the flick. Each of the video frames is analyzed to identify direction of the user input, distance (in pixels) traveled within the frame and time taken to travel the distance. A normal angle of the flick is computed by identifying point of contact between the second object and the game object as defined in the user input. The point of contact is established when the second object enters a collision zone of the game object. The velocity is computed as a function of the direction, distance and time aspect of the user input determined from the analysis and the physics properties/attributes associated with the game object. The computed velocity is used in manipulating the distance and direction of movement of the game object along the normal angle within the game scene of the game play.

In one embodiment, the game object is imparted with the computed velocity when the computed velocity defined by the user input is beyond (i.e., greater than) a pre-defined threshold value.

In one embodiment, an angle of curvature of the spherical contour of the second object is dynamically adjusted based on a level of gameplay achieved within the game.

In another embodiment, a method for using touch-screen interface to provide user input to a game during gameplay, is disclosed. The method includes detecting selection of a game object for gameplay. The game object is rendered in two dimensions and is associated with a rigid body component and a three-dimensional collider component. The rigid body component and the collider component are used to associate one or more physics properties/attributes to the game object to enable control of the physical behavior of the game object during gameplay. User input is detected at the touch-screen interface of a computing device rendering the gameplay. The user input is used to manipulate a game cursor provided in a game scene of the game. The game cursor is associated with a second three-dimensional collider component and at least a portion of the game cursor is defined to have a spherical contour. The game object of the game is controlled using the game cursor based on the user input. The controlling of the game object includes at least one of balancing the game object on the spherical/circular contour portion of the game cursor and moving the game object in the game scene. The movement is adjusted in accordance to one or more physics attributes/properties associated with the game object.

In another embodiment, a non-transitory computer readable storage medium embedding program logic for performing a method for using touch-screen interface to provide user input to a game during gameplay, is disclosed. The computer readable storage medium includes program logic to detect selection of a game object for gameplay, wherein the game object is rendered in two dimensions and is associated with a rigid body component and a three-dimensional collider component, the rigid body component and the collider component used to associate one or more physics properties (i.e., attributes) to the game object to enable control of the physical behavior of the game object during gameplay; program logic to detect user input at the touchscreen interface of a computing device rendering the gameplay, the user input used in moving and controlling a game cursor provided in a game scene of the game, wherein at least a portion of the game cursor has a circular contour, the game cursor is associated with a second three-dimensional collider component, wherein the user input is applied at the circular contour portion of the game cursor; and program logic to control movement of the game object of the game using the game cursor based on the user input, wherein the controlling of the game object includes at least one of balancing the game object on the circular contour portion of the game cursor and moving the game object in the game scene. The program logic for controlling movement of the game object includes program logic to adjust the movement of the game object in accordance to one or more of the plurality of physics attributes associated with the game object Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods and apparatus for controlling user input in a gameplay of a video game. It will be apparent, that the present embodiments may be practiced without some or all of these specific details. In other instances, well known process operations have not been described in detail in order not to unnecessarily obscure the present embodiments.

The embodiments provide ways to control and move a game object based on user input in a gameplay of a video game so as to provide a more realistic rendition of the game to a user. The game object is defined and rendered as a two-dimensional object and is attached to a three-dimensional collider component and a rigid body component. The three-dimensional collider component is used to define a three-dimensional shape to the game object. The rigid body component associates one or more physics attributes/properties to the game object and defines physical behavior of the game object. The three-dimensional collider component together with the rigid body component allow physical interactions between the game object and other objects provided in a game scene of the game in accordance to laws of physics and control movement of the game object based on the forces defined by the rigid body component or based on forces applied to it during interactions with other objects to provide more realistic gameplay.

The various embodiments described herein define game object manipulation in accordance to user input and interactions with other objects of a game that follow various laws of physics enabling users to have a more realistic gameplay experience. In these embodiments, one of the dimensions of the three-dimensional collider component used to define the game object and the game cursor is fixed to enable interaction in two-dimensional rendition. The realistic nature of the gameplay will keep the user more engaged and satisfied, ultimately leading to more game revenue for the developer of the game. With the brief overview of the invention, various embodiments for controlling user input for a video game will now be described with reference to the enclosed drawings.

It should be noted that the various embodiments are described herein with reference to one type of interactive game, to provide a general understanding. It should, however, be noted that the principles may be extended to other online games that benefit from keeping a player engaged for a longer period of time. The embodiments described herein should therefore not be interpreted to be exclusive or limiting, but rather exemplary or illustrative.

Figure 1:
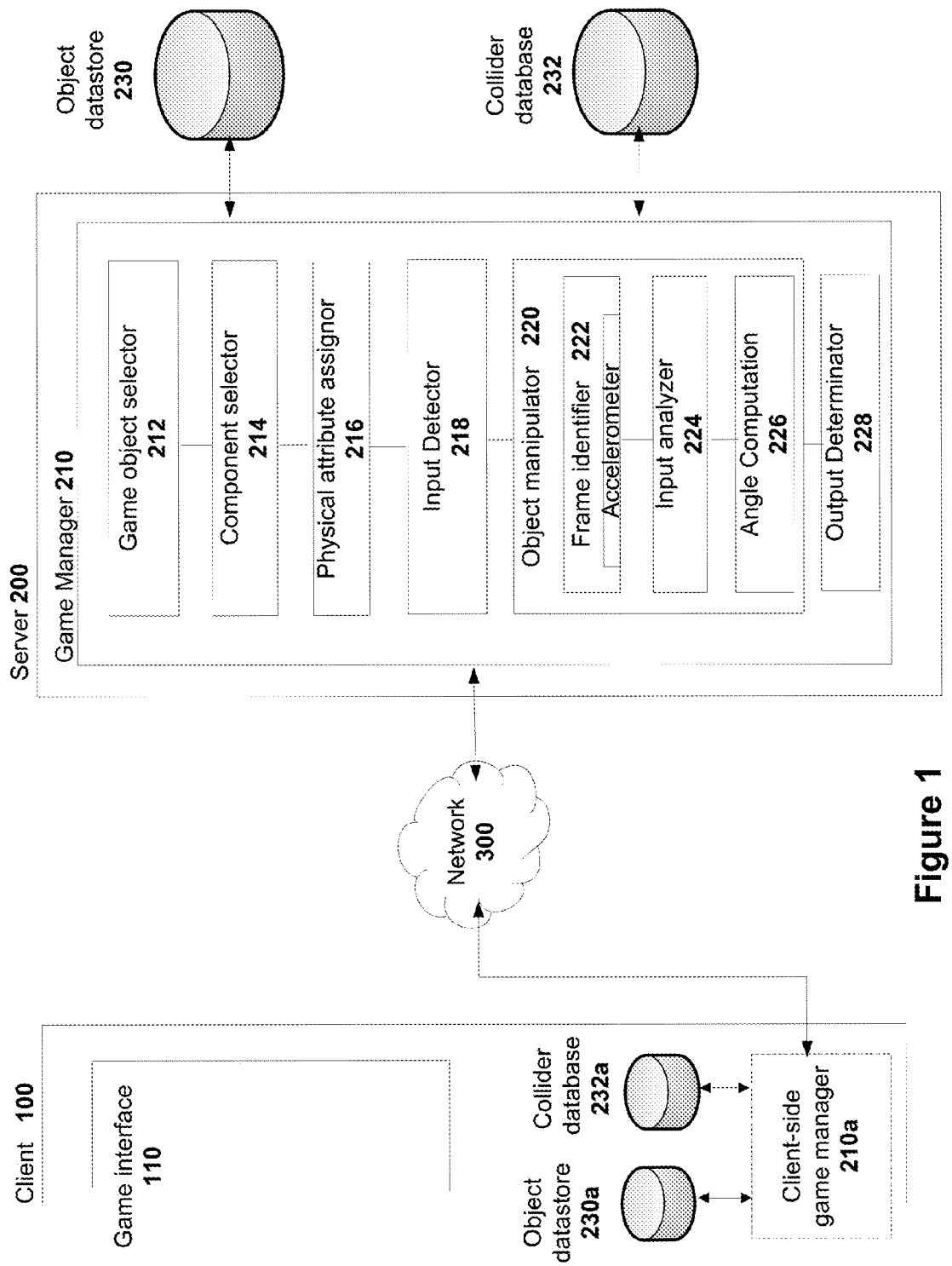
FIG. 1 illustrates a simplified block diagram of a system for determining outcome of an online slot game, according to one embodiment.

FIG. 1 is an illustrative embodiment of a system used for controlling user input in a gameplay of a video game. The system includes a server 200 executing the interactive video game. In one embodiment, the server 200 may be a game console executing the video game. In another embodiment, the server 200 may be a game server hosting the online video game and executing an instance of the video game. In one embodiment, the server 200 may be part of a game cloud system. The server 200 hosting/executing the online video game includes a game manager 210 having a plurality of modules to control movement of a game object within a game scene of a game. Some exemplary modules within the game manager 210 include a game object selector module 212, a component selector module 214, a physical attribute assignor module 216, an input detector module 218, and an object manipulator module 220. The object manipulator module 220, in turn, may include one or more sub-modules, such as a frame identifier sub-module 222, an input analyzer sub-module 224, an angle computation sub-module 226 and an output determinator sub-module 228. The one or more modules/sub-modules within the game manager 210 interacts with one or more data stores, such as an object datastore 230, a collider datastore 232, to name a few, to retrieve appropriate game related data. For example, the game object selector 212 may interact with the object datastore 230 to retrieve one or more game objects for a player to choose from, and with the collider datastore 232 to retrieve the appropriate three-dimensional collider component and rigid body component (if needed) that is to be applied to the selected game object. In one embodiment, in addition to selecting a three-dimensional collider component and the rigid body component for associating with the game object of the player, the collider datastore 232 may also be used to select a rigid body component and/or a three-dimensional collider component to associate with other objects included in a game scene of the game, including game objects of other players. The various modules/sub-modules of the game manager may interact with additional datastores, such as player history datastore (not shown) to store and retrieve player related information including previously selected game object, etc., game datastore (not shown) to view and select the video game available for game play on the server, etc.

A player (i.e., a user), in one embodiment, initiates access to the video game executing on the server using a game interface 110 on a client device 100 that is executing a computer program, such as a web browser. In another embodiment, the client may execute other computer programs other than the web browser to initiate interaction with the game executing on the server 200 through the game interface 110. The game interface 110 facilitates transmission of command and data between the client 100 and the various modules/sub-modules of the game manager 210 executing on the server 200. In one embodiment, the client device 100 is used to access the video game executing on a game cloud server over a network 300, such as the Internet.

In another embodiment, a portion 210a of the game manager 210 is available on the client device 100. In this embodiment, when a player initially accesses the video game on the server 200 from the client device 100, such as a mobile device, the portion 210a of the game manager 210 is downloaded onto the client device 100. The game manager portion 210a on the client device may include client version of at least some of the modules that are available on the server 200. For example, the game manager portion 210a on the client device 100 may include game object selector module 212a (not shown), a component selector module 214a (not shown), an input detector module 218a (not shown) and an object manipulator module 220a (not shown). Each of the aforementioned modules in the game manager 210a provides the same processing functionality locally as the corresponding server side modules and may include all or some of the sub-modules that are available on the server side modules. In addition, the client device may also include client-version of the datastores to allow selection and storage of data related to the gameplay of the video game locally. The client-version of the datastores may be a subset of the datastores that are available on the server and may only include data related to the user's gameplay. The client side game manager 210a allows the user to play the video game locally on the client device and update the gameplay of the video game rendering on the client device based on the user input provided by the user during gameplay. The modules of the client side game manager 210a interact with the corresponding server side modules to exchange interaction data stored in the respective datastores to influence the outcome of the video game as well as to synchronize the video game. For example, the user input and the game state of the video game from the client device may be updated to the video game executing on the server and such updates may be through the backend either synchronously or asynchronously. The ability to execute the game locally on the client side allows for faster updates to the game as it avoids the network latency between the client and the server devices, thereby allowing the user to have a rich game playing experience. The server side modules, in these embodiments, may provide the initial data to populate the user interface on the client device, including data for user selection, such as a list of the video games available on/accessed by the server device, the different game objects, different game cursors, etc. The server side modules may also provide at least a minimal level of data processing. The functionality of the various modules will now be described with reference to the server-side modules, but it should be noted that these module functionalities can be extended to the corresponding client-side modules, as well.

In one embodiment, the game manager 210 provides access to the online video game and manages the game operations for the player. The various modules within the game manager 210 are configured to interact with each other to process the various input data provided by the player and to perform the various game operations of the online video game, such as manipulation of the game object, adjusting attributes of the game object, game cursor, and other objects in the game scene (such as increasing or decreasing circular contour, increasing or reducing friction between objects, etc.), etc. In addition, the various modules within the game manager access and manage game related data stored in the various databases (i.e., datastores) during the execution of the online game. The game object selector 212 is used to identify one or more game objects that are defined and available for gameplay of the video game and present the identified game objects for player selection at the user interface 110 on the client device 100. User selection of the game object is detected and the selected game object is assigned and made available to the player during gameplay. The game objects available for user selection and gameplay are defined in two dimensions. In some embodiments, the game object selected for gameplay has a circular contour. In other embodiments, the game object may have other shapes including some portions of the game object being circular and other portions of the game object being non-circular.

The component selector module 214 receives the game object selected by the player as input from the game selector module 212 and determines the geometry of the selected game object. Based on the geometry of the game object, the component selector module 214 selects either a simple or a compound three-dimensional collider to associate with the game object. The simple collider component, otherwise termed a "primitive" collider component, includes a single collider that correlates with the shape of the game object selected for gameplay. On the other hand, a compound collider component includes a combination of simple or primitive collider components with each simple collider component correlating with shape and size of a particular portion of the game object. The simple collider component for associating with the game object is selected from a group including a box collider for wrapping around a square game object or square portion of the game object, a spherical collider for wrapping around a circular game object or a circular portion of the game object, a capsule collider with radius and height that can be adjusted for wrapping around a cylindrical game object or a cylindrical portion of the game object, a wheel collider, a conical collider, a pyramid shaped collider, and the compound collider includes a combination of one or more simple collider components selected from the box, sphere, cone, pyramid, capsule or a wheel collider. In some embodiments, the component selector module 214 selects one of the dimensions of the three-dimensional collider component and fixes it during gameplay. As a result, when a simple or compound collider component is used to associate with the game object, based on the geometry of the objects, one of the dimensions (for example, the 'z' dimension of an x, y, z dimensions) in each of the primitive component is fixed. For example, each of the collider components is defined by (x, y, z) dimensions, the component selector module may fix the z dimension of the collider component. When a compound collider component is defined for the game object, the z dimension of each of the primitive component of the collider component that is used to define the game object, is fixed. The collider component provides the three-dimensional shape to the two-dimensional game object while allowing two-dimensional input to be used to control and move the game object.

In addition to selecting and associating appropriate one or more collider components, the component selector module 214 associates a rigid body component to the selected game object. The rigid body component together with the collider component are used to define physical interactions between the game object and other objects, including other game objects, within a game scene of the game. As more than one game object may be provided in the game, especially in a multi-player video game where distinct game objects are selected by different players, the component selector module 214 is used to assign appropriate collider components to the respective game objects that correlate with the geometrical shape and size of the respective game objects as well as rigid body components. Each game object may be of different shape and size. As a result, each game object may be defined by either a simple or compound collider components.

In addition to the game objects, other objects that are part of a game scene of the video game may also be defined by one or more collider components. The other objects may be associated with just the collider component or may be associated with both the collider component and the rigid body component depending on the type of object being defined and the functional role played by the object within the game scene. Some of the objects in the game scene may be defined as stationary objects while some others may be defined as moveable objects. In some embodiments, some of the objects defined in the game may not have a defined shape. As a result, in addition to the above list of collider components, a mesh collider component may be used to provide a three-dimensional shape to such objects. For example, a stationary object, such as a rock, a tree, a coral-reef, etc., in a game scene may be associated with a mesh collider component.

Once the collider and rigid body components are selected, the information related to the different collider components associated with the selected game object(s) are provided to the physical attribute assignor module 216. The physical attribute assignor module 216 assigns one or more physical attributes to the game object in accordance to the rigid body component associated with the game object(s), wherein the physical attributes are used to define physical behavior of the selected game object. In some embodiments, the physical attributes defined by the physical attribute assignor module include one or more of mass, linear drag, angular drag, gravity, kinematic attributes, collision detection, motion constraints, etc. The rigid body component enables the game object to which it is associated, to respond to the various pull and push forces that are applied to the game object as part of gameplay interactions. In some embodiments, the pull and push forces provided by a user on the user interface are interpreted in two dimension format. The rigid body component and the three-dimensional collider component together define the physical behavior of the game object to make the interaction between the game object and other objects of the game follow various laws of physics, making the interaction more realistic and convincing to the players.

Once the components and physical attributes are assigned to the selected game object(s) and each of the other objects within the game, the game manager proceeds to monitor game activity within the game including detecting user input at the game interface, interpret the user input and control the movement of the game object across the game scene in accordance to the detected user input and laws of physics. Toward this end, the input detector module 218 detects the user input provided at a user interface of the client device and transmitted to the game manager, analyzes the user input to determine the various input attributes, computes one or more game related parameters and use the computed parameters to control the movement of the game object, in response to the user input. In one embodiment, the game related parameters that are computed include a force or velocity associated with the user input based on the user input attributes and physical attributes associated with the game object and applies the computed force or velocity to the game object. In one embodiment, the input attributes detected from the user input include direction of the user input, distance traveled within the game scene and time taken to travel the distance.

In one embodiment, the user input provided at the user interface of the client device is used to direct a game cursor to move the game object provided in the game scene of the game. At least a portion of the game cursor includes a circular contour and the user input is provided at the circular contour of the game cursor to enable the game cursor to interact with the game object. In one embodiment, the game object has a circular contour (for e.g., a ball) and the user input applied at the circular contour portion of the game cursor is used to balance the ball over the game cursor's circular contour. For example, the game cursor provided at the user interface may be in the form of an image of a finger and the circular contour portion is defined by the finger tip of the finger. In this example, the game object is associated with a spherical collider and at least the circular contour portion of the game cursor is associated with a spherical collider. The user input interpreted in two dimensions is used to balance the ball object on the rounded tip of the finger while the ball is acted on by gravitational forces defined by the rigid body component associated with the ball. In other words, the user input provided in two dimensions is used to simulate the interaction between the ball and the finger tip in three dimensions. To balance the ball on the fingertip, the computed force provided by the user input at the three-dimensional ball object is sufficient to overcome the force of gravity acting on the rigid body component of the game object.

Figure 2A:
FIGS. 2A-2H illustrate exemplary game play rendition capturing different interactions that are used to manipulate game objects, in accordance with various embodiments.

FIG. 2A illustrates an example of a game cursor provided at the game interface for manipulating the game object, such as the ball, in one embodiment. In this embodiment, the game cursor is shown as an image of a finger and the user input is applied at the finger tip. The user input acts to balance the ball in accordance to the three-dimensional form associated with the ball and the finger.

Figure 2B:
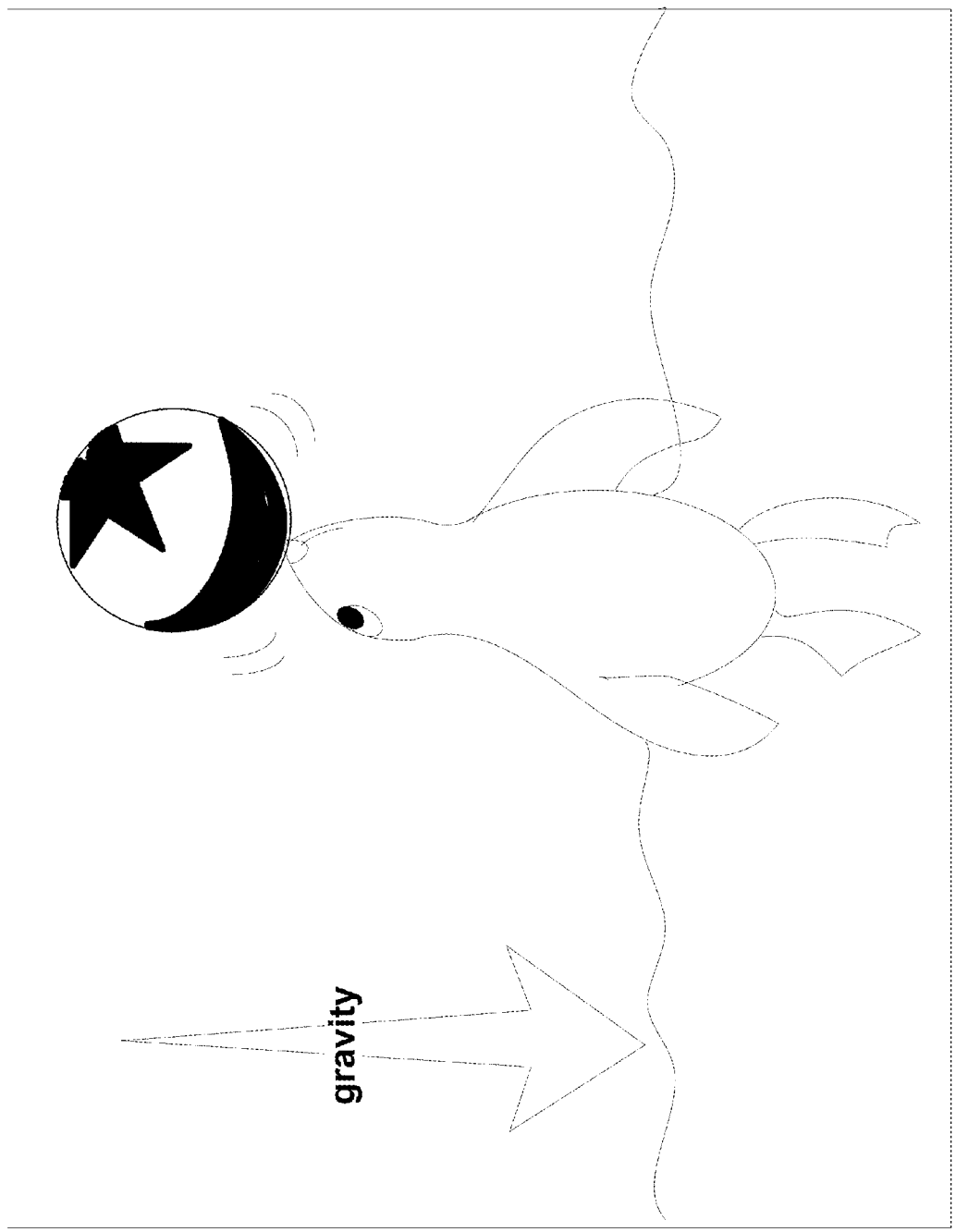

FIG. 2B illustrates an example of a game cursor provided at the game interface for manipulating the ball game object, in an alternate embodiment. In this embodiment, game cursor is in the form of a seal with the tip of the nose of the seal having a circular contour. User input at the seal is used to balance the ball, while the force of gravity acts on the ball due to its association with the rigid body component. In this embodiment, portion of the game cursor (i.e., tip of the nose of the seal) has a circular contour while the remaining portions are non-circular (i.e., rest of the body of the seal).

Figure 2C:
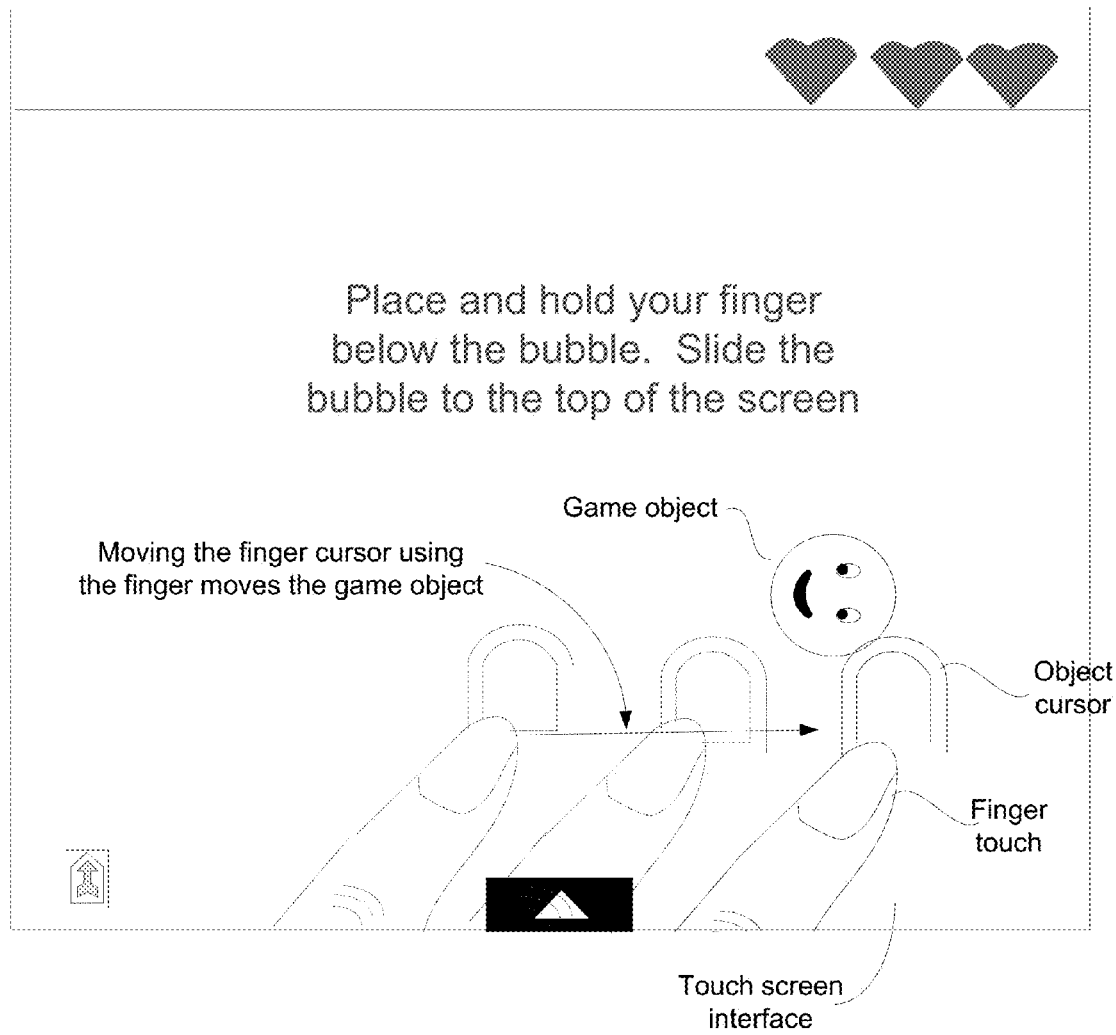
Figure 2D:
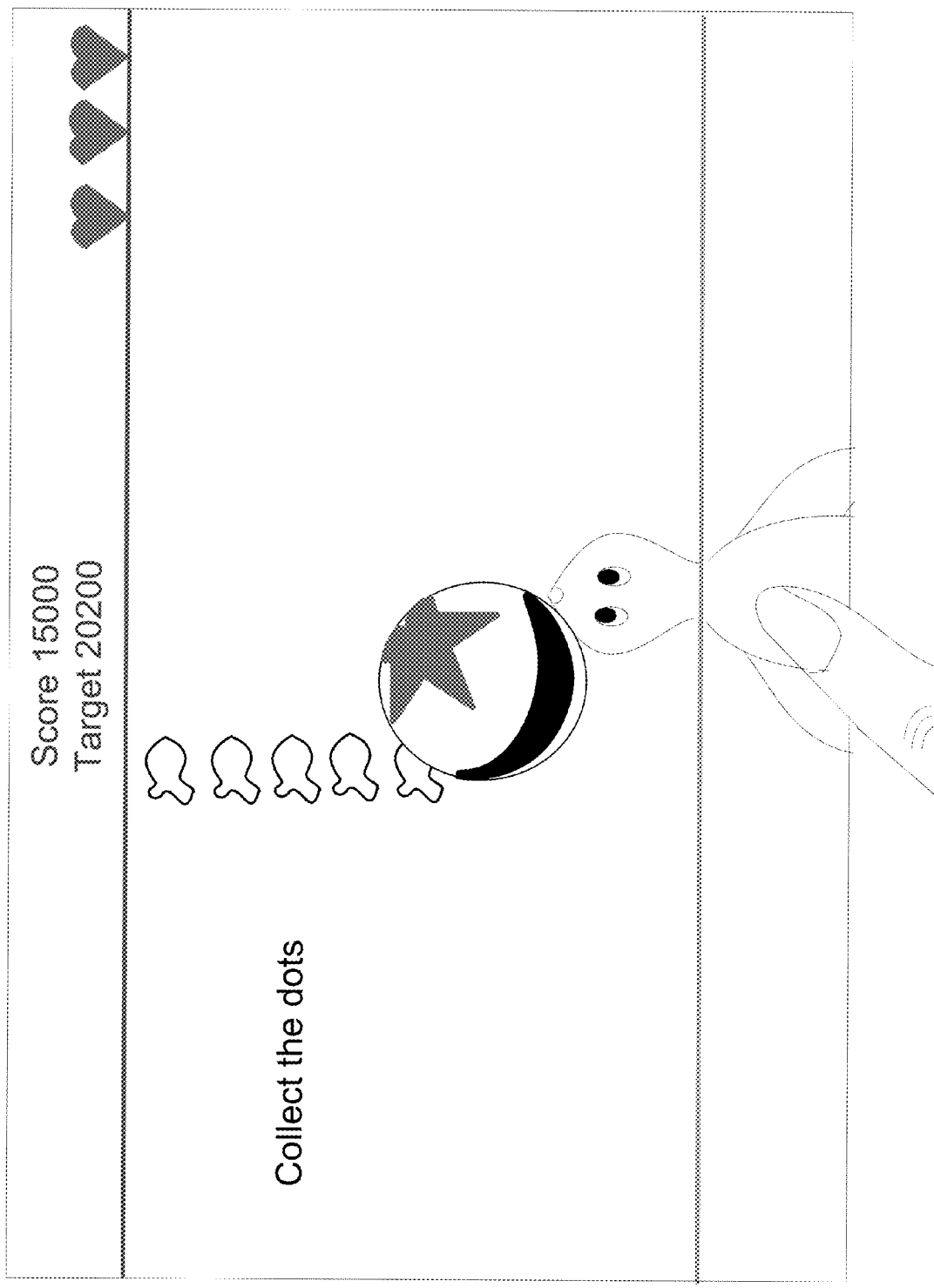
Figure 2E:
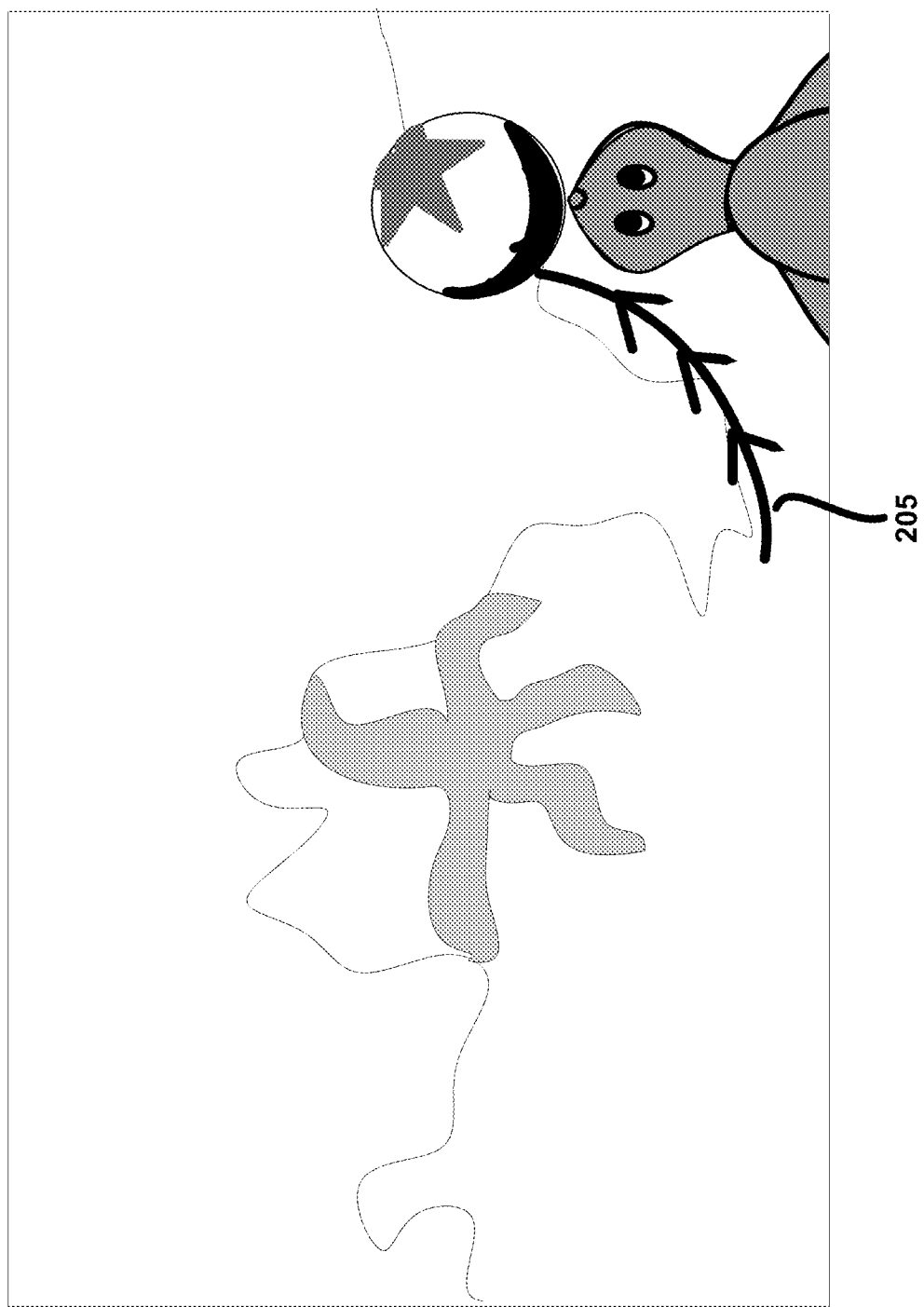

In some embodiments, the user input provided at the user interface of the client device is used to control movement of the game cursor to not only balance the game object at the circular contour of the fingertip but is also used to move the game object across the game scene and to flick the game object across the game scene of the gameplay. The game object may be moved around moveable and immoveable objects provided in the game scene, toward a goal, or may be moved to interact with the moveable/immoveable objects. FIG. 2C illustrates user input provided at the finger image that is used to control movement of the ball game object to the right of the game scene, in one embodiment. FIG. 2D illustrates, in one embodiment, moving the game object using the game cursor to capture objects provided in the game scene to score points, move toward a goal, or to advance in the game. In the embodiment illustrated in FIG. 2D, the game cursor (i.e., the seal) is used to move the game object (i.e., the ball) to collect dots to score points. A leaderboard may be provided by the game manager at the user interface to provide game status to a user during gameplay. FIG. 2E illustrates the game object being balanced and moved around an immoveable object, such as a coral, provided in the game scene using the user input provided at the circular contour of the game cursor, as illustrated by line 205. In the embodiments illustrated in FIGS. 2A-2E, the user input is provided using finger-touch on a touch-screen interface.

As illustrated in FIGS. 2A-2E, in addition to the game object(s) of the player(s) and the game cursor, other objects are presented in the game scene to provide sufficient challenges during gameplay. The other objects may include a combination of stationary objects and moveable objects. The other objects may be associated with simple or compound collider components to associate a three-dimensional form and, where applicable, with a rigid body component, as well. In some embodiments, some of the moveable objects may be configured to move in predictable paths or patterns across the game scene while some other moveable objects are configured to move toward other objects, such as the game objects. In addition to moving toward game objects, the moveable objects may move toward other moveable objects and stationary objects. In the embodiment where the moveable object moves toward the game object, the game manager dynamically determines the location of the game object in the game scene by checking every video frame during gameplay, determining the coordinates of the game object as the game object is being moved across the game scene, and moving the moveable object toward the game object.

Figure 2F:
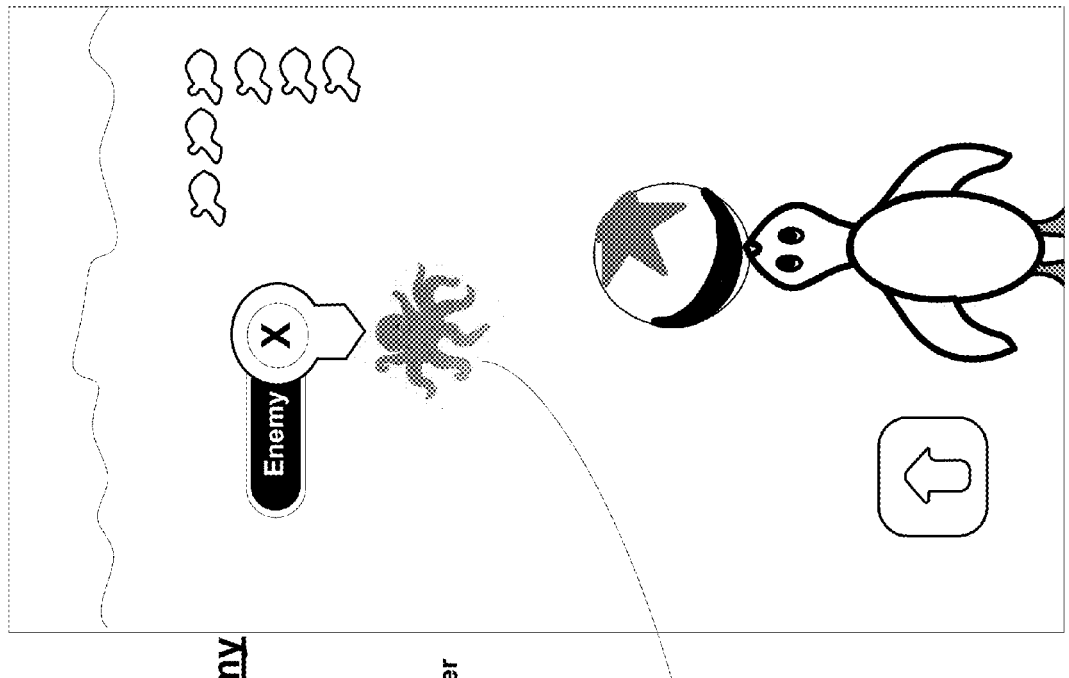

FIG. 2F illustrates an example of a moveable object (i.e., octopus, in accordance to an ocean theme defined in the game) that is configured to move toward the game object (i.e., ball). The octopus is one example and other objects, such as a shark, whale, etc., in keeping with the ocean theme of the game, for example, may also be defined. The game manager controls movement of the octopus toward the ball by checking every video frame of a game scene that has registered the movement of the ball to determine the current coordinates of the ball and then controls movement of the octopus to move toward the ball's coordinates. The octopus is designed to continue to move toward the ball till it hits the ball's collider. In this embodiment, as part of gameplay, the user input provided at the game cursor is used by an output determinator sub-module 228 to control the ball to move away from the octopus in order to achieve the gameplay goal.

Figure 2G:
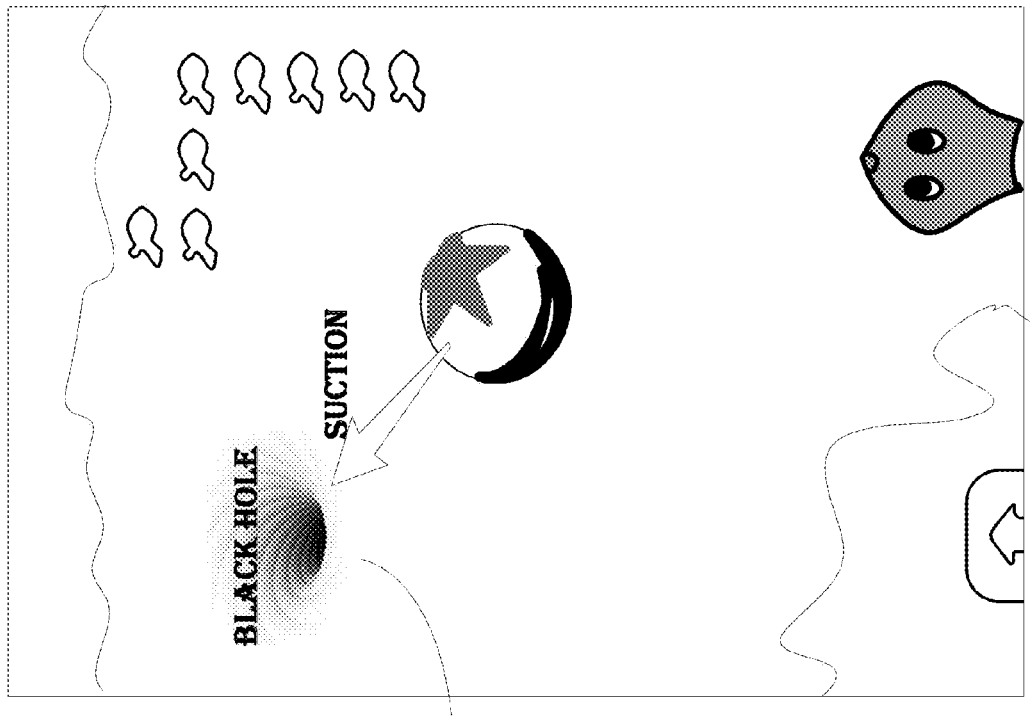

In some embodiments, some of the stationary objects may be configured to exhibit a force of attraction that acts on the moveable objects, including the game object, as the moveable object(s) enter the attraction zone of the stationary objects and causes the moveable object(s) to be pulled toward the stationary object. The user input at the game interface of a touch-screen device is used to overcome the force of attraction and/or move the game object away from the attraction zone of the stationary object. FIG. 2G illustrates, in one embodiment, a stationary object, such as a black hole, provided in the game scene that is designed to have a suction force (i.e., force of attraction) to attract the ball (i.e., game object) or other moveable objects toward it. In this embodiment, user input may be provided at the game interface to prevent the ball from being sucked into the black hole. Accordingly, the user input is provided accordingly to the game cursor so as to cause the game cursor to move between the ball and the black hole causing the ball to deflect away from the black hole. The user input is used to determine the direction of deflection and amount of force to be applied to the ball. In this embodiment, the force applied to the ball should be equal to or greater than the force of attraction provided by the black hole.

In some embodiments, the user input provided through the game cursor is used to balance the game object with spherical contours on top of the circular contour of the game cursor. In other embodiments, the user input is used to balance the spherical form of the game object over the circular contour of the game cursor and to flick the game object across the game scene. The game manager is configured to take the curve of the game cursor into consideration and apply the laws of physics when trying to balance the spherical contour of the game object on the circular contour of the game cursor while force, such as gravity, in accordance to the laws of physics act on the game object. In one embodiment, the user input is used by the input analyzer sub-module 224 to identify a plurality of input parameters. The user input is provided in the form of a finger gesture and the game manager interprets the finger gesture to identify the input parameters of the user input. Some of the input parameters determined by the input analyzer sub-module 224 include direction of the user input, linear drag of the user input, angular drag of the user input, etc. The input parameters from the input analyzer sub-module 224 and the user input are provided to a frame identifier sub-module 222 to compute the distance traveled and the time taken to travel the distance. In one embodiment, input from the accelerometers, gyroscopes, etc., may be used by the frame identifier sub-module 222 to compute the distance and the time. The frame identifier sub-module 222 identifies video frames of the user interface on which the user input was registered, computes the distance traveled within each video frame, in pixels, and aggregates the distance D across all the identified video frames. In one embodiment, the linear drag and angular drag defined in the user input may influence the distance traveled. The time T taken is computed similarly by the frame identifier sub-module 222 by determining time taken to travel the distance in each identified video frame and aggregating the time across all identified video frames. The computed time T and the distance D will determine how fast or slow the game object is moved across the screen. In other words, the speed of the finger gesture across the user interface provided in the user input is simulated by the momentum provided to the game object during the game object manipulation.

Figure 2H:
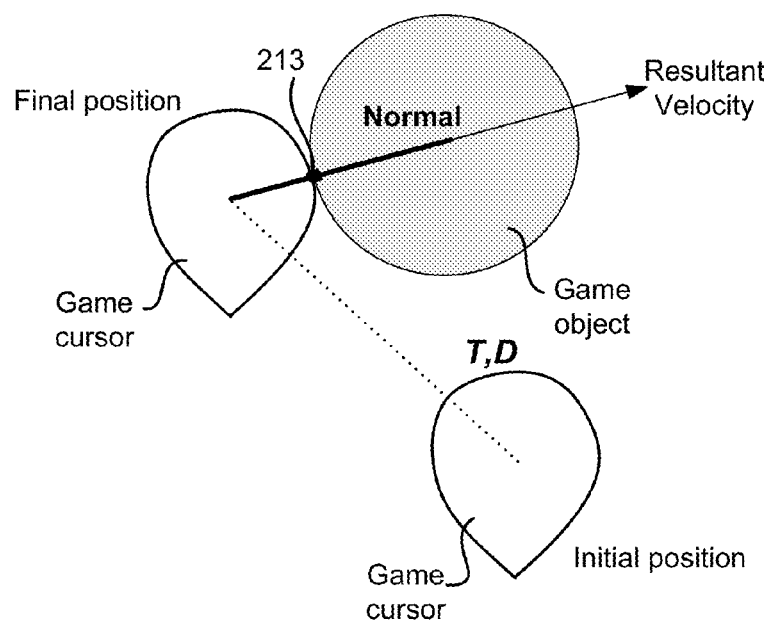

The input parameters and the user input from the input analyzer sub-module 224 acts as input to the angle computation module 226 to determine the direction for imparting a force or velocity to the game object. The direction for imparting the velocity or the force is determined by first identifying a point of contact between the game object and the game cursor as the game cursor is manipulated to enter a collision zone of the game object. It should be noted that the game cursor as used in this application refers to a cursor provided within the game scene of a video game during gameplay, through which user input may be received for controlling movement of the game object. In one embodiment, the collision zone of the game object is defined as the region or area that immediately surrounds the game object. In another embodiment, the collision zone is defined along the outer boundary of the game object. The point of contact between the game object and the game cursor is used by the angle computation module 226 to determine a normal angle of the user input. A normal angle of interaction is defined at the point of contact by drawing a line that extends from the point of contact through the center of the game object. FIG. 2H illustrates the normal angle, illustrated by line 213, defined by the contact point 'X' between the game object (i.e., ball object) and the game cursor (i.e., seal or finger). Additionally, the time taken T to travel distance D (in pixels) across the input interface provided by the last input (i.e., last drag) at the game object is also computed. The normal angle determined by the angle computation sub-module 226 identifies the direction for imparting the force or the velocity to the game object, wherein the velocity or force is computed as a function of T, D.

In some embodiments, the input parameters, such as the direction, distance and time, as well as the physical attributes, such as mass, etc., of the game object are used, in accordance to laws of physics, to compute the velocity and/or the force imparted to the game object along the normal angle. An output determinator sub-module 228 computes a velocity and/or force that is to be imparted to the game object during game play using the input parameters identified by the various sub-modules 222, 224, 226. In some embodiments, the object manipulator 220 determines if the computed velocity/force is greater than a pre-defined threshold value maintained by the object manipulator. If the velocity/force is greater than the pre-defined threshold value, the object manipulator manipulates the game object in the direction of the normal angle.

In one embodiment, to provide challenges to the player, the angle of curvature of the circular portion of the game cursor may be increased or decreased dynamically based on level of the game achieved by the player. When the player is at the beginning levels of the game, the angle of curvature may be decreased to allow the player to easily balance the game object on the curvature of the game cursor and manipulate the game object across the scene toward a goal. As the player reaches higher levels and becomes adept in the game, the angle of curvature may be dynamically increased by programmatically adjusting the parameters related to the angle of curvature of the game cursor to provide sufficient challenges to the player. The input parameters of the user input takes into consideration the angle of curvature in controlling movement of the game object. In an alternate embodiment, the value of the force of gravity may be increased programmatically to provide challenge to the player. In yet another embodiment, the friction between the game object and the game cursor may be reduced programmatically. In this embodiment, the reduced friction would cause the game object to slide off the game cursor faster and would pose greater challenge to the player to balance the curved contour portion of the game object on the curved contour portion of the game cursor. The list of challenges that may be provided to the player is exemplary and that additional challenges or combination of the aforementioned challenges may also be provided to the player to make the gameplay more interesting and challenging.

As mentioned earlier, user input, in the form of finger gesture at a touch-screen user interface, is used to balance the game object on a spherical portion of the game cursor. When the finger is removed from the touch-screen, the game object begins to fall downward toward a bottom of the screen simulating the pull of gravity on the game object. The game object may be prevented from falling down by using user input in the form of the finger gesture at the game cursor re-establish contact with the game object. The finger gesture acts to "catch" the falling game object and balance it on the circular contour of the game cursor thereby preventing the downward progress of the game object. In one embodiment, the act of catching using the circular contour of the game cursor may by simulated by the game object bouncing back upward in the game scene. In this embodiment, as the game object hits the apex of the curve on the game cursor, the game object bounces back. Sliding the game cursor to the side of the game object may help in arresting the downward progress of the game object, aid in balancing the game object on the apex and assist in re-directing the game object.

Figure 3:
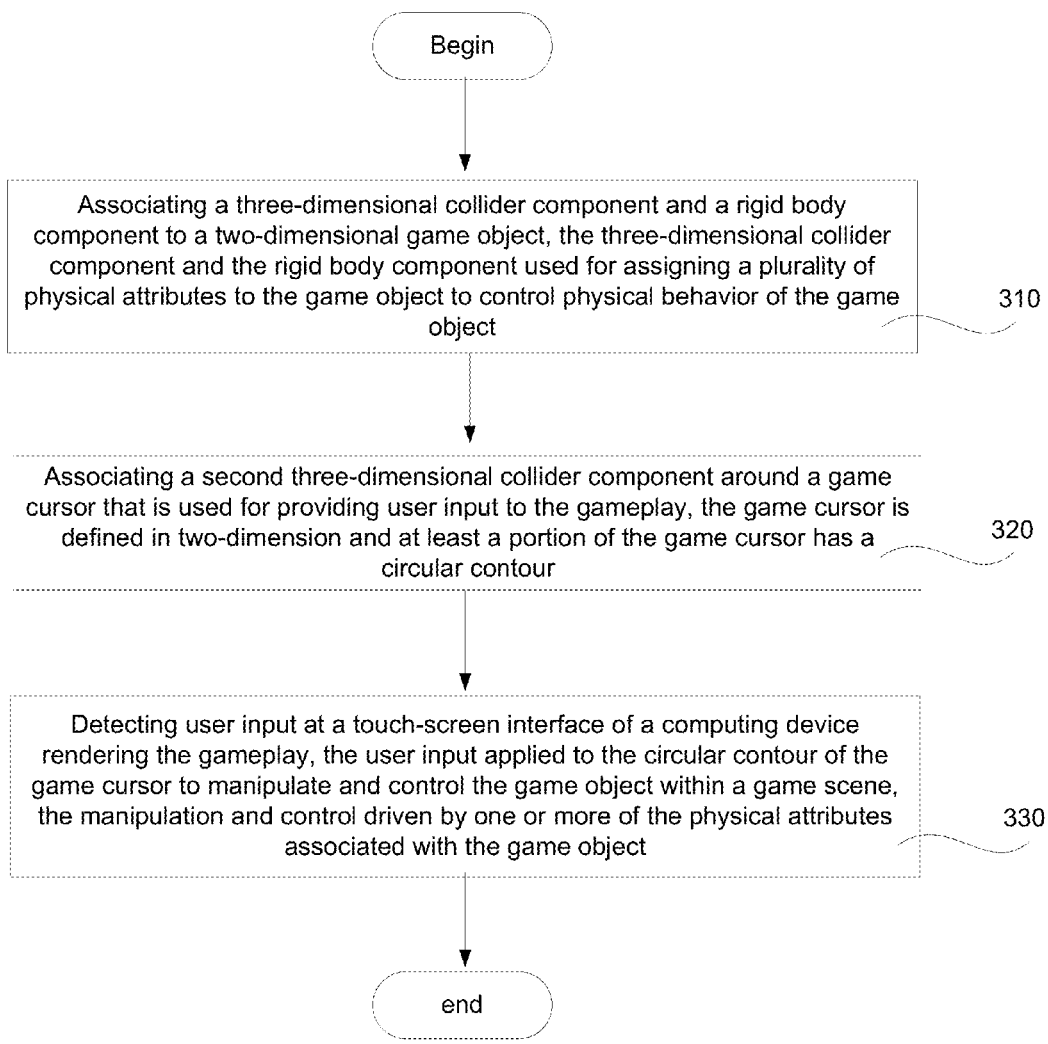
FIG. 3 illustrates a flowchart of operations for manipulating a game object in a video game, in accordance with one embodiment.

With the various detailed embodiments, a method for controlling user input in a gameplay of a video game will now be described with reference to FIG. 3. The method begins at operation 310 wherein a three-dimensional collider component and a rigid body component are associated with a game object that is used in the gameplay of the video game. The game object is defined as a two-dimensional object. The rigid body component is used to assign a plurality of physics attributes to the game object that are used to control the physical behavior of the game object. The collider component is used to provide a three-dimensional form to the game object. A game cursor used to provide user input to the game play is associated with a second three-dimensional collider, as illustrated in operation 320. At least a portion of the game cursor has a circular contour. User input is detected at a touch-screen interface of a computing device that is rendering the gameplay of the video game, as illustrated in operation 330. The user input is applied at the circular contour portion of the game cursor causing the circular contour portion of the game cursor to control movement of the game object within a game scene of the game play. The controlling of the game object is based on one or more of the plurality of physics attributes associated with the game object.

Figure 4:
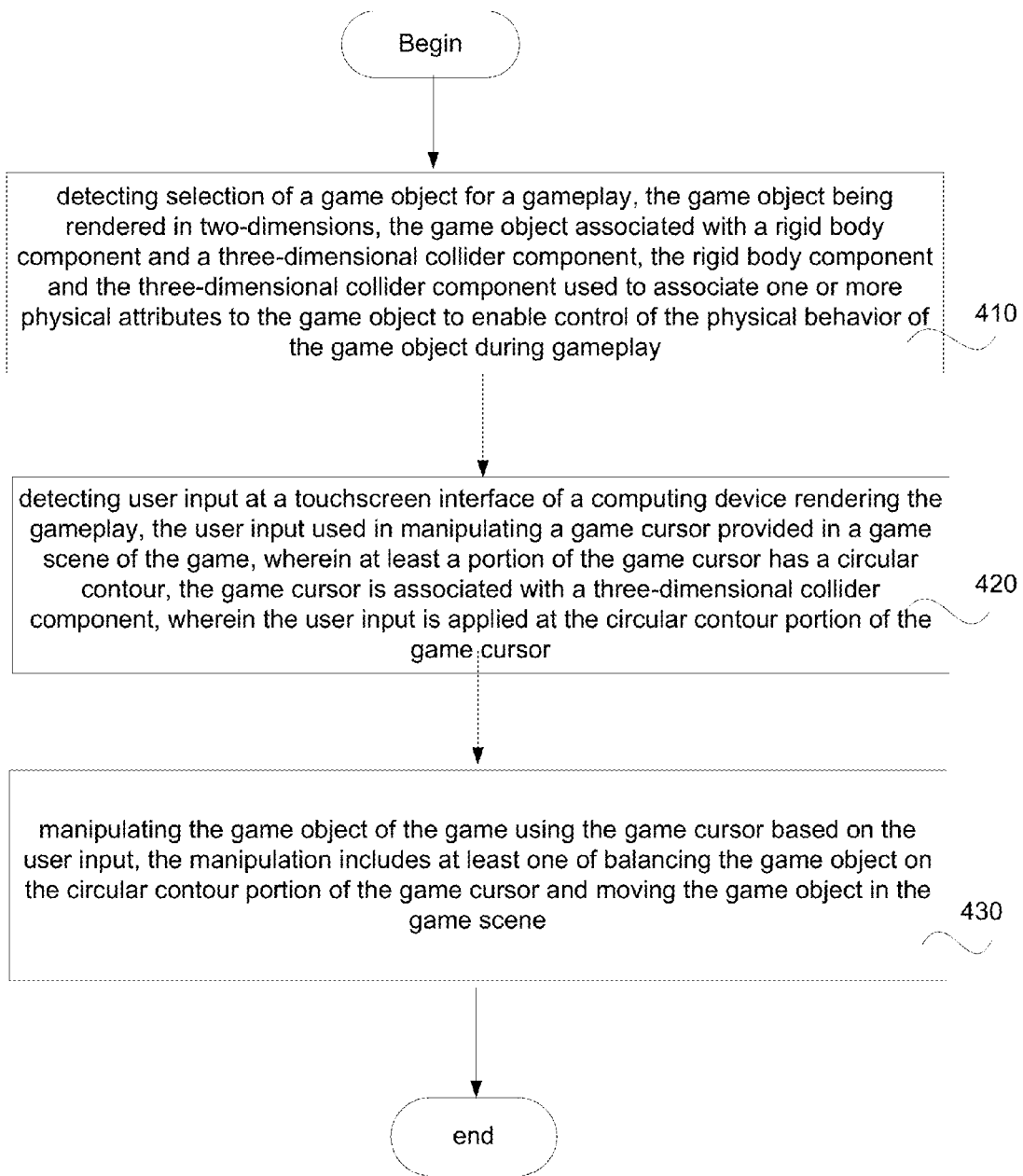
FIG. 4 illustrates a flowchart of operations for manipulating game object in a video game, in accordance with an alternate embodiment.

FIG. 4 illustrates an alternate embodiment of a method for using touchscreen interface to provide user input to a game during gameplay. The method includes detecting selection of a game object for the gameplay, as illustrated in operation 410. The game object is rendered in two dimensions and is associated with a rigid body component and a three-dimensional collider component. The rigid body component and the collider component are used to associate one or more physics attributes to the game object to enable control of the physical behavior of the game object during game play. User input is detected at the touchscreen interface of a computing device rendering the gameplay, as illustrated in operation 420. The user input is used to move and control a game cursor provided in a game scene of the game. The game cursor is associated with a second three-dimensional collider component. A portion of the game cursor has a circular contour and the user input is applied at the circular contour portion of the game cursor. The game object of the video game is controlled to move within a game scene, in accordance to the user input applied at the spherical contour portion of the game cursor, as illustrated in operation 430. The control includes balancing the game object on the spherical contour portion of the game cursor and/or moving the game object in the game scene of the game.

The various embodiments of the invention provide ways to control movement of a game object using input provided at a touchscreen interface. The game object has a circular contour and is manipulated by a game cursor that receives user input from a finger gesture provided at the touchscreen interface. The game cursor includes at least a portion that has circular contour and the user input applied to the circular contour portion is used to control movement of the game object while one or more forces act on the game object during gameplay. The forces acting on the game object may include force of attraction exhibited by one or more objects defined in the game scene of the video game, deflective forces caused by user input, gravitational forces acting on the game object due, in part, by the rigid body component associated with the game object. The game object manipulation is in accordance to two dimensional user input and the laws of physics and provides a more realistic depiction of interaction between the game object and other objects during gameplay of the video game, thereby enhancing the player's gameplay experience. Further, the various embodiments describe how the two-dimensional user input is used to provide a three-dimensional game play experience by using the two dimensional user input at the game cursor to provide a three-dimensional interaction at the game object.

Figure 5:
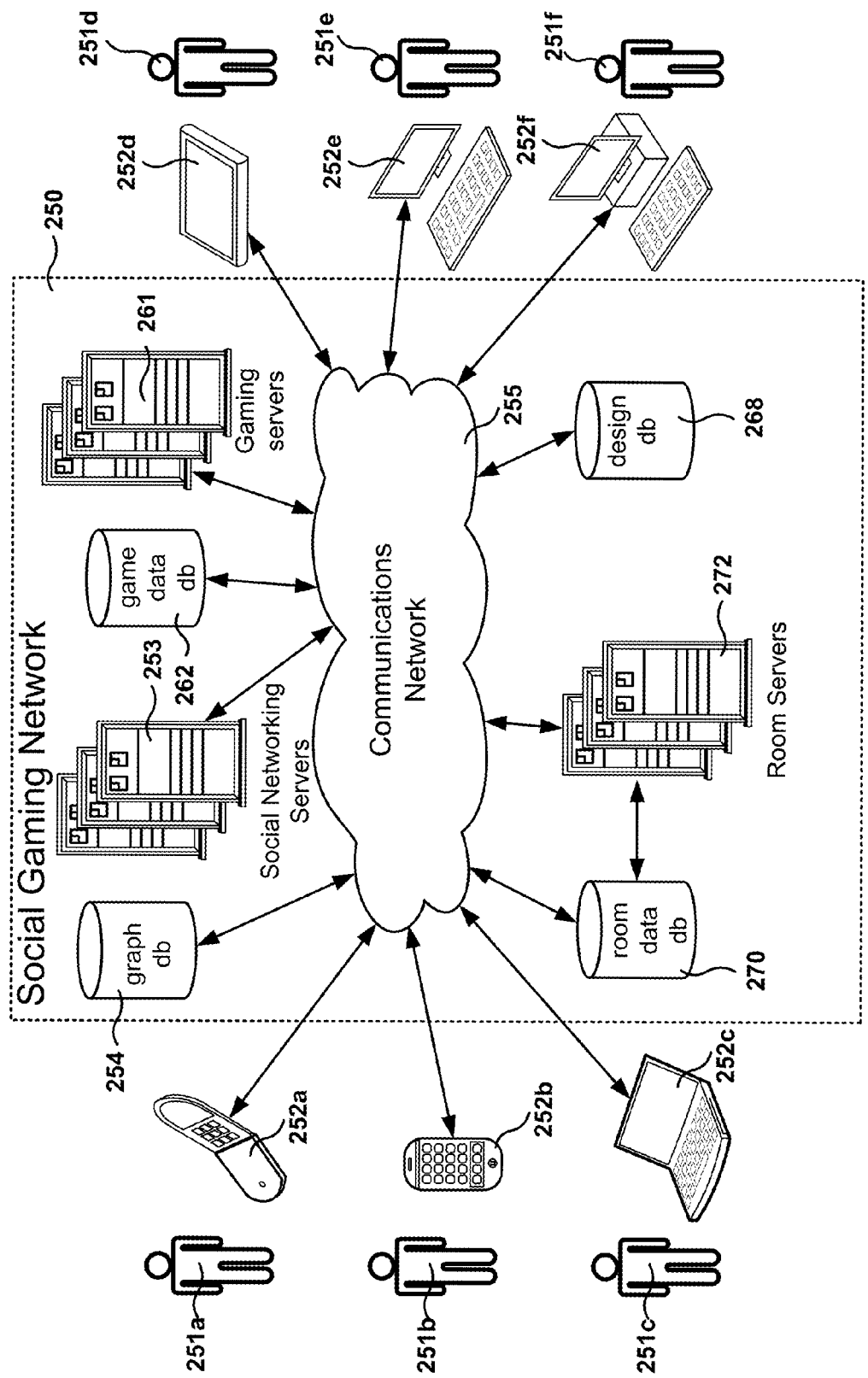
FIG. 5 shows a block diagram illustrating a social-gaming network architecture, according to one embodiment.

FIG. 5 shows a block diagram illustrating exemplary social-gaming network architecture, according to one embodiment. In some implementations, a plurality of players (e.g., 251a-251f) may be utilizing a social gaming network 250. Each player interacts with the social gaming network via one or more client devices (e.g., client devices 252a-252f). The clients may communicate with each other and with other entities affiliated with the gaming platform via communications network 255. Further, the players may be utilizing a social networking service provided by a social networking server (e.g., social networking servers 253) to interact with each other.

When a player provides an input into the player's client device, the client device may in response send a message via the communications network to the social networking server. The social networking server may update the player profile, save the message to a database, send messages to other players, etc. The social gaming network may include a social graph database 254, which stores player relationships, social player profiles, player messages, and player social data.

The gaming servers 261 host one or more gaming applications, and perform the computations necessary to provide the gaming features to the players and clients. One or more gaming databases 262 store data related to the gaming services, such as the gaming applications and modules, virtual gaming environment data, player gaming session data, player scores, player virtual gaming profiles, game stage levels, etc. The gaming servers may utilize the data from the gaming databases to perform the computations related to providing gaming services for the players.

Room Servers 272 manage the slot rooms system in the game, including the creation, tracking, expiration, abandonment, and deletion of rooms. In addition, a room database 270 holds room information, and design db 268 holds information data.

Figure 6:
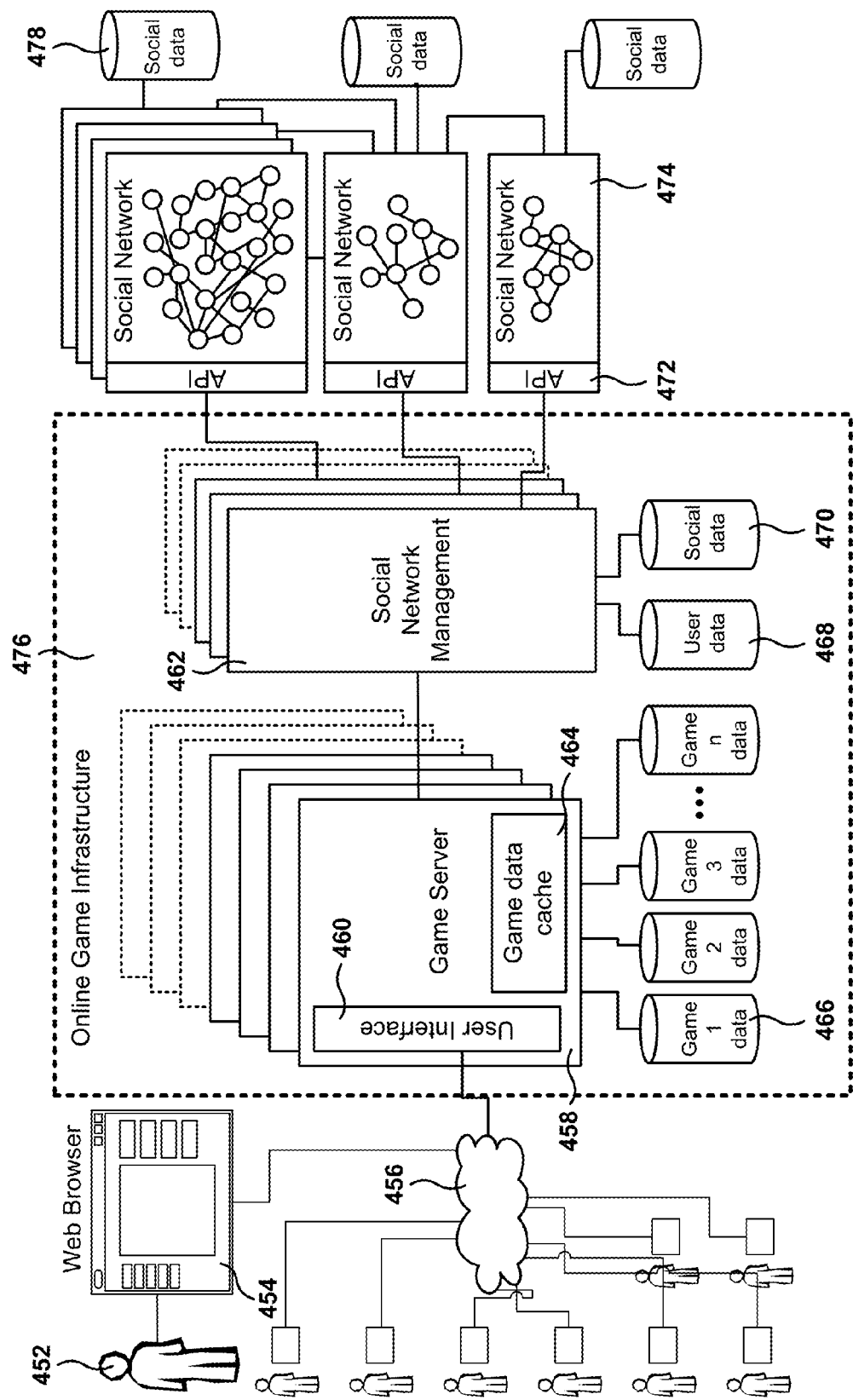
FIG. 6 illustrates an implementation of a Massively Multiplayer Online (MMO) infrastructure, according to one embodiment.

FIG. 6 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook®, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

Figure 7:
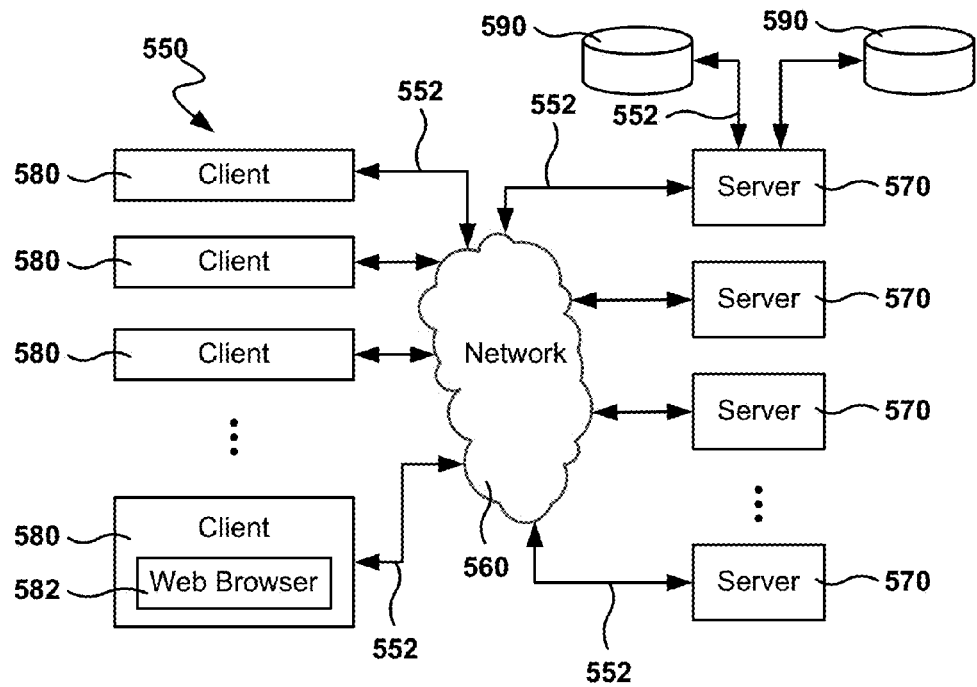
FIG. 7 illustrates an example network environment suitable for implementing embodiments.

It is noted that the embodiment illustrated in FIG. 7 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 8 should therefore not be interpreted to be exclusive or limiting, but rather exemplary or illustrative.

FIG. 7 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, slots server, jackpot server, gambling server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more servers 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 8:
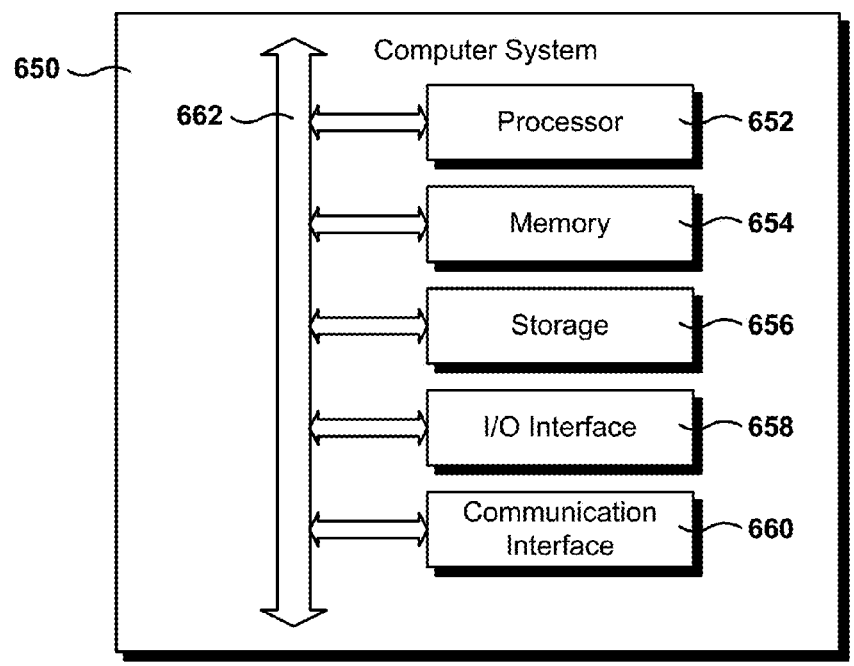
FIG. 8 illustrates an example computer system for implementing embodiments.

FIG. 8 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnects.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for controlling user input in a gameplay of a video game, comprising:

associating a three-dimensional collider component and a rigid body component to a two-dimensional game object used and rendered in the gameplay, the three-dimensional collider component and the rigid body component used for assigning a plurality of physics attributes to the game object to enable control of physical behavior of the game object;

associating a second three-dimensional collider component around a game cursor that is used for providing user input to the gameplay, wherein the game cursor is defined in two-dimensions and at least a portion of the game cursor has a circular contour; and detecting user input at a touch-screen interface of a computing device rendering the gameplay, the user input applied to the circular contour portion of the game cursor to move and control the game object within a game scene of the game play, wherein in addition to the user input, the movement and control of the game object being adjusted by one or more of the plurality of physics attributes associated with the game object, wherein operations of the method are executed by a processor.

2. The method of claim 1, wherein one dimension of the three-dimensional collider component and the second three-dimensional collider component being fixed during gameplay.

3. The method of claim 1, wherein geometry of the three-dimensional collider component correlates with dimension and shape of the game object and the geometry of the second three-dimensional collider component correlates with the dimension and shape of the game cursor.

4. The method of claim 1, wherein the game object selected for gameplay has a circular contour.

5. The method of claim 1, wherein a shape of the three-dimensional collider component provided around the game-object is one of a box collider, a sphere collider, a capsule collider, a wheel collider or one or more combinations thereof.

6. The method of claim 1, wherein the user input is used to balance the game object on the spherical contours of the game cursor.

7. The method of claim 1, wherein the user input is used to balance the game object on the spherical contours of the game cursor and to flick the game object across the game scene during gameplay, the flick used in determining one of a velocity or a force to be imparted to the game object during manipulation of the game object.

8. The method of claim 7, wherein determining velocity further includes, identifying video frames of the touch-screen interface that have registered the user input defined in the flick;

analyzing the user input at each of the video frames to identify one or more input parameters, wherein the input parameters identified from the analysis include at least a direction of the user input, distance traveled within the video frame and time taken to travel the distance;

computing normal angle of the flick by identifying contact point between the game cursor and the game object as provided by the user input when the game cursor enters collision zone of the game object; and computing the velocity as a function of the direction, distance and time parameters of the user input determined from the analysis and the one or more of the plurality of physics attributes associated with the game object, the velocity used in manipulating the distance and direction of movement of the game object along the computed normal angle within the game scene of the game play.

9. The method of claim 7, wherein the game object is flicked when the velocity defined by the user input is greater than a pre-defined threshold value.

10. The method of claim 1, wherein an angle of curvature of the circular contour of the game cursor provided at the game scene to move the game object is adjustable to correlate with a level of the video game selected for gameplay.

11. The method of claim 1, wherein the user input is used to manipulate around one or more objects within the game scene during gameplay, wherein the one or more objects include stationary objects and moveable objects, one or more of the stationary objects are configured to exhibit a force of attraction to attract the game objects toward the stationary object when the game object enters an attraction zone of the one or more stationary objects, and one or more of the moveable objects are configured to dynamically identify location of the game object and move toward the game object.

12. The method of claim 1, wherein the user input is used to re-establish contact with the game object during gameplay.

13. A method for using a touchscreen interface to provide user input to a game during gameplay, comprising:

detecting selection of a game object for the gameplay, the game object being rendered in two-dimensions and being associated with a rigid body component and a three-dimensional collider component, the rigid body component and the three-dimensional collider component are used to associate one or more physics attributes to the game object to enable control of the physical behavior of the game object during gameplay;

detecting user input at the touchscreen interface of a computing device rendering the gameplay, the user input used in moving and controlling a game cursor provided in a game scene of the game, wherein at least a portion of the game cursor has a circular contour, the game cursor is associated with a second three-dimensional collider component, wherein the user input is applied at the circular contour portion of the game cursor; and controlling movement of the game object of the game using the game cursor based on the user input, the controlling of the game object includes at least one of balancing the game object on the circular contour portion of the game cursor and moving the game object in the game scene, the movement being adjusted in accordance to one or more of the plurality of physics attributes associated with the game object, wherein the operations of the method are executed by a processor.

14. The method of claim 13, wherein one dimension of the three-dimensional collider component and the second three-dimensional collider component being fixed during gameplay.

15. The method of claim 13, wherein the game object selected for gameplay has a circular contour.

16. The method of claim 13, wherein the physics attributes defined for the game object include one or combination of mass, linear drag, angular drag, gravity, kinematic attributes, collision detection, and motion constraints.

17. The method of claim 13, wherein the controlling of the game object further includes, determining contact point between the game object and the game cursor defined by the user input;

computing a normal angle of impact based on the contact point defined by the user input; and analyzing the user input to determine one or more input parameters, the input parameters used in computing velocity or a force to be imparted to the game object in a direction defined by the normal angle.

18. The method of claim 17, wherein computing velocity further includes, identifying video frames associated with the user input;

analyzing each video frame to identify direction of the user input, distance traveled in pixels within the video frame and time taken to travel the distance; and computing the velocity as a function of the direction, distance and time parameters of the user input determined from the analysis and the physics attributes associated with the game object, the velocity used in controlling the distance and direction of movement of the game object along the normal angle within the game scene of the game.

19. The method of claim 13, wherein an angle of curvature of the circular contour of the game cursor provided in the game scene is dynamically adjustable to correlate with a level of the game selected for gameplay.

20. A non-transitory computer readable storage medium embedding program logic, which when executed by a processor of a computing device, performs a method for using touchscreen interface to provide user input to a game during gameplay, the computer readable storage medium including:

program logic for detecting selection of a game object for the gameplay, the game object being rendered in two-dimensions and being associated with a rigid body component and a three-dimensional collider component, the rigid body component and the three-dimensional collider component are used to associate one or more physics attributes to the game object to enable control of the physical behavior of the game object during gameplay;

program logic for detecting user input at the touchscreen interface of the computing device rendering the gameplay, the user input used in moving and controlling a game cursor provided in a game scene of the game, wherein at least a portion of the game cursor has a circular contour, the game cursor is associated with a second three-dimensional collider component, wherein the user input is applied at the circular contour portion of the game cursor; and program logic for controlling movement of the game object of the game using the game cursor based on the user input, the controlling of the game object includes at least one of balancing the game object on the circular contour portion of the game cursor and moving the game object in the game scene, the movement being adjusted in accordance to one or more of the plurality of physics attributes associated with the game object.

* * * * *